United States Patent
Wagenhoffer, Jr.

(10) Patent No.: US 8,136,778 B2
(45) Date of Patent: *Mar. 20, 2012

(54) DEVICE FOR DISPLAYING OBJECTS SUCH AS PHOTOS AND SHEETS ON LAPTOP AND VIDEO MONITOR SURFACES

(76) Inventor: John Wagenhoffer, Jr., Smyrna, DE (US)

( * ) Notice: Subject to any disclaimer, the term of this patent is extended or adjusted under 35 U.S.C. 154(b) by 344 days.

This patent is subject to a terminal disclaimer.

(21) Appl. No.: 12/510,330

(22) Filed: Jul. 28, 2009

(65) Prior Publication Data

US 2010/0155554 A1  Jun. 24, 2010

Related U.S. Application Data

(63) Continuation-in-part of application No. 12/342,653, filed on Dec. 23, 2008.

(51) Int. Cl.
*A47F 5/00* (2006.01)
*B65D 81/02* (2006.01)

(52) U.S. Cl. ............... 248/309.1; 428/156; 206/586; 361/681

(58) Field of Classification Search ............... 248/309.1, 248/223.31, 441.1, 314, 225.11, 442.2; 361/679.01, 361/679.03, 681, 679.04; 428/156, 158; 206/586, 320, 592, 521, 523; D14/450; D3/218, D3/294

See application file for complete search history.

(56) References Cited

U.S. PATENT DOCUMENTS

| | | | |
|---|---|---|---|
| 656,342 A | 8/1900 | Carlton | |
| 925,694 A | 6/1909 | Greenwood | |
| 1,052,906 A | 2/1913 | Ellis | |
| 1,167,719 A | 1/1916 | Saulmon | |
| 3,315,894 A | 4/1967 | Kluck | |
| 3,812,609 A | 5/1974 | Volden | |
| 4,028,832 A * | 6/1977 | Wu | 248/490 |
| 4,991,328 A * | 2/1991 | Rousseau et al. | 40/780 |
| 5,104,076 A | 4/1992 | Goodall, Jr. | |
| D358,582 S | 5/1995 | Funaki | |
| 5,515,976 A * | 5/1996 | Moren et al. | 206/586 |
| 5,535,928 A | 7/1996 | Herring | |

(Continued)

FOREIGN PATENT DOCUMENTS

DE 202004008842 U1 7/2004

(Continued)

*Primary Examiner* — Tan Le
(74) *Attorney, Agent, or Firm* — Connolly Bove Lodge & Hutz LLP

(57) ABSTRACT

A display device and method for displaying objects in association with a front or rear face of a screen display or screen display frame of a computer or video monitor or laptop or other framed structure is in one embodiment a flexible, lengthwise deformable band with at least two, usually four, spaced-apart corner-engaging loops. In a second embodiment, the device has at least first, second and third flexible lengthwise deformable bands that each wrap around a screen display or screen display frame. The at least three bands optionally are joined together at portions that overlap one another, or an integral band assembly is formed that has corner-engaging loops between points of overlap or crossover of said bands. In another embodiment, one or more flexible bands are joined at each end to the screen display frame of a computer or video monitor or laptop, leaving a central portion of each flexible band movably deformable with relation to the front surface or rear surface of the frame. In yet another embodiment, deformable resilient material is embedded within a slot behind the front surface of the screen display frame.

13 Claims, 7 Drawing Sheets

U.S. PATENT DOCUMENTS

| | | | |
|---|---|---|---|
| 5,648,757 A * | 7/1997 | Vernace et al. | 340/539.32 |
| 5,664,673 A | 9/1997 | Perry | |
| 5,678,792 A | 10/1997 | Arguin et al. | |
| D393,838 S | 4/1998 | Pandolfi | |
| 5,743,414 A | 4/1998 | Baudino | |
| 5,759,644 A | 6/1998 | Stanley | |
| 5,890,309 A | 4/1999 | Markarian | |
| 5,890,603 A * | 4/1999 | Arguin et al. | 248/442.2 |
| 5,988,582 A | 11/1999 | Olivo | |
| 6,230,878 B1 | 5/2001 | Lehr | |
| D453,162 S | 1/2002 | Shim et al. | |
| 6,390,429 B1 | 5/2002 | Brincat | |
| 6,412,744 B1 | 7/2002 | Wollam et al. | |
| 6,430,856 B1 | 8/2002 | Schwartz | |
| D463,439 S | 9/2002 | Olivo | |
| 6,443,415 B1 | 9/2002 | Sundblad | |
| 6,478,282 B1 | 11/2002 | Flemming | |
| D469,100 S | 1/2003 | Salem | |
| D476,332 S | 6/2003 | Lin | |
| 6,616,111 B1 * | 9/2003 | White | 248/309.1 |
| 6,817,128 B2 | 11/2004 | Korpai | |
| D508,054 S | 8/2005 | Ramsey | |
| 6,932,309 B1 | 8/2005 | Corey et al. | |
| D511,780 S | 11/2005 | Korpai | |
| 7,048,245 B1 | 5/2006 | Voelker | |
| D533,181 S | 12/2006 | Florindo | |
| D557,897 S * | 12/2007 | Richardson et al. | D3/294 |
| D565,839 S | 4/2008 | Allen | |
| 7,359,184 B2 | 4/2008 | Lord | |
| D593,319 S * | 6/2009 | Richardson et al. | D3/218 |
| 2004/0025993 A1 | 2/2004 | Russell | |
| 2004/0227048 A1 | 11/2004 | Lom et al. | |
| 2007/0090254 A1 | 4/2007 | Del Frari | |
| 2007/0138364 A1 | 6/2007 | Wynn | |
| 2010/0104814 A1* | 4/2010 | Richardson et al. | 428/156 |
| 2010/0155554 A1* | 6/2010 | Wagenhoffer, Jr. | 248/223.31 |
| 2010/0155568 A1* | 6/2010 | Wagenhoffer, Jr. | 248/694 |
| 2011/0228459 A1* | 9/2011 | Richardson et al. | 361/679.01 |

FOREIGN PATENT DOCUMENTS

| | | |
|---|---|---|
| EP | 1254615 | 11/2002 |
| GB | 2367940 | 4/2002 |

* cited by examiner

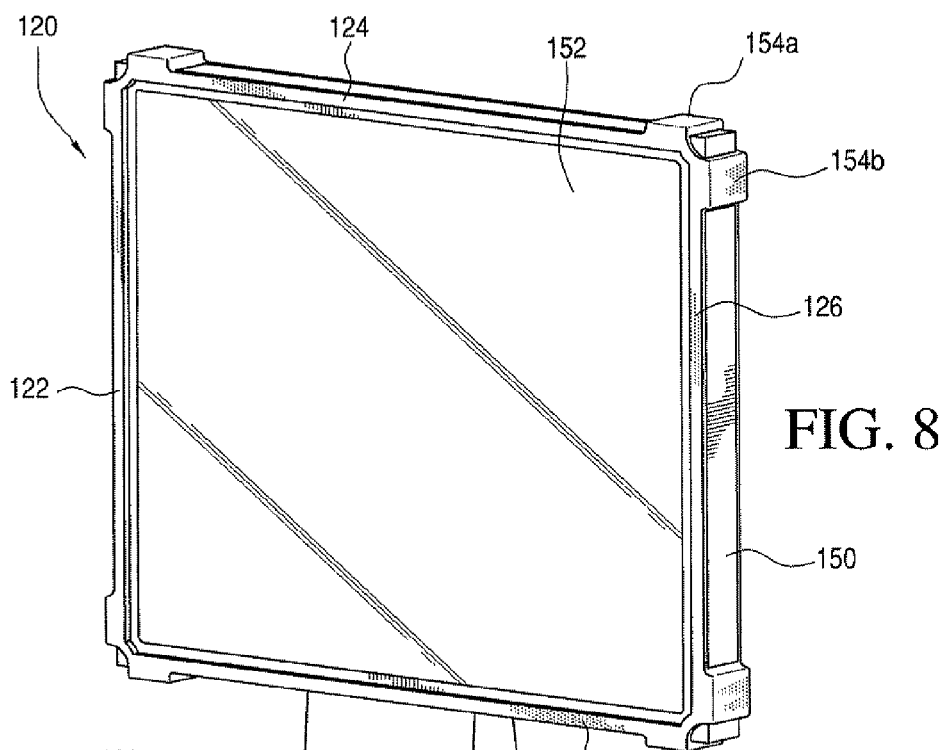
FIG. 8
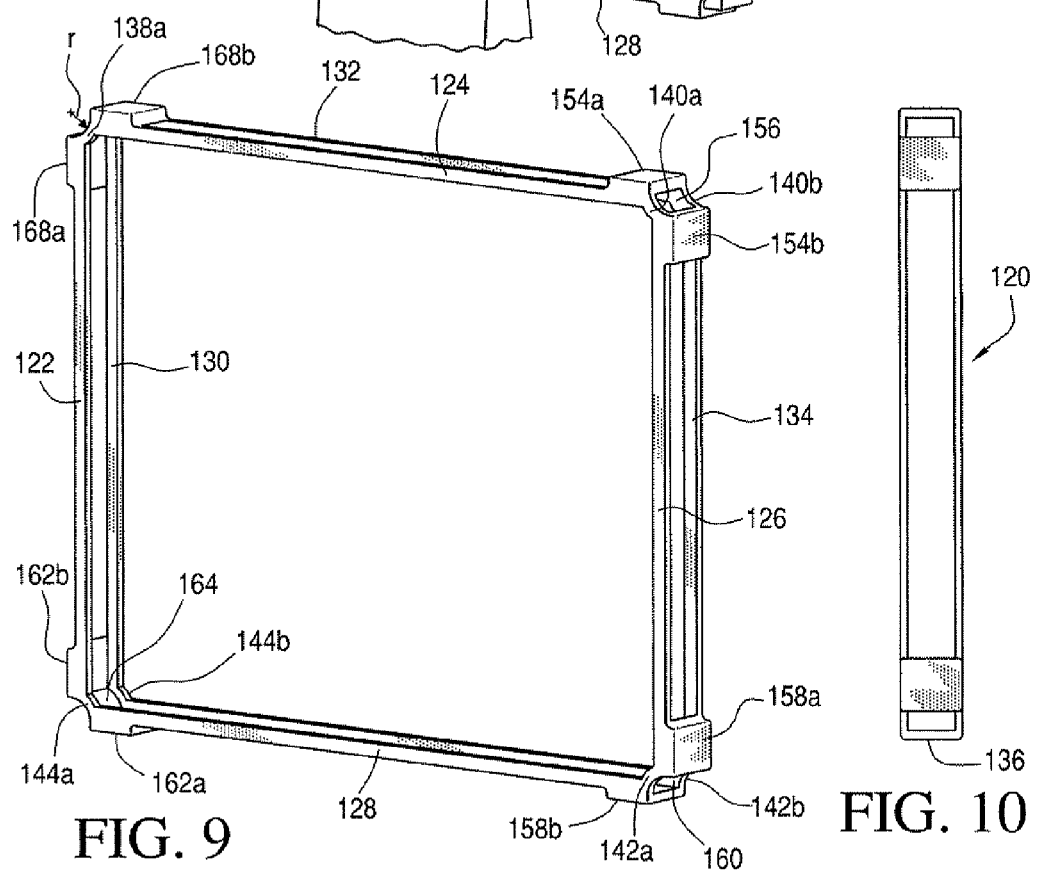
FIG. 9
FIG. 10

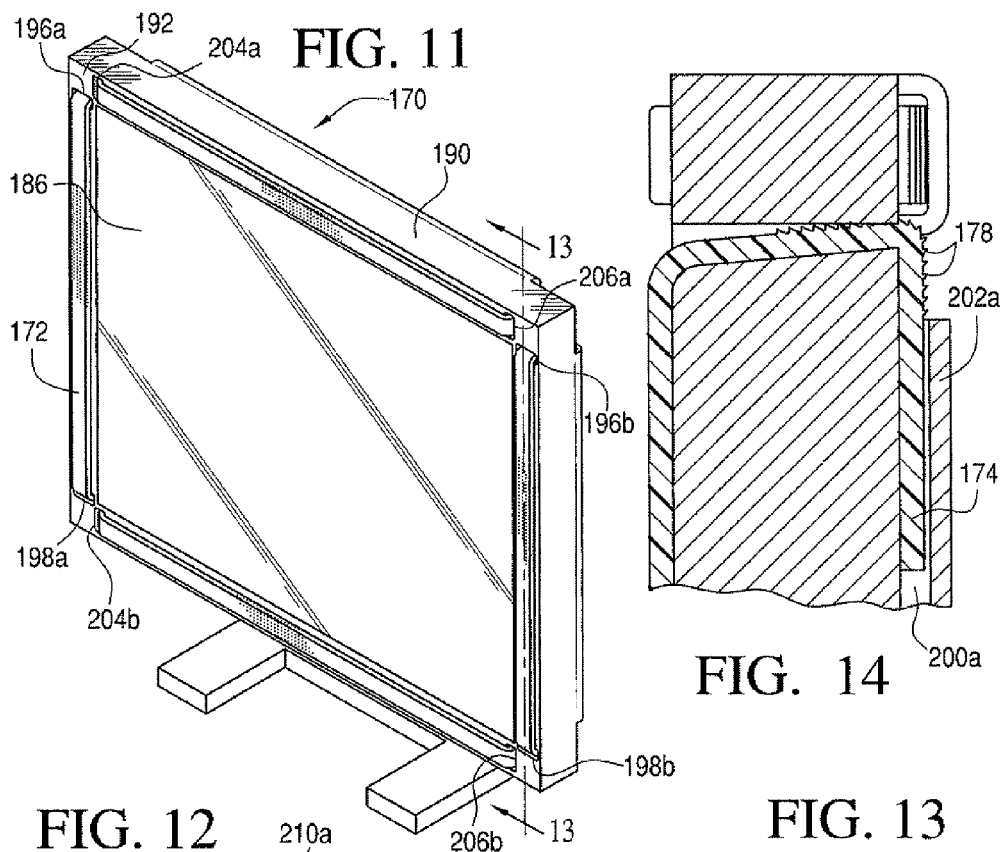
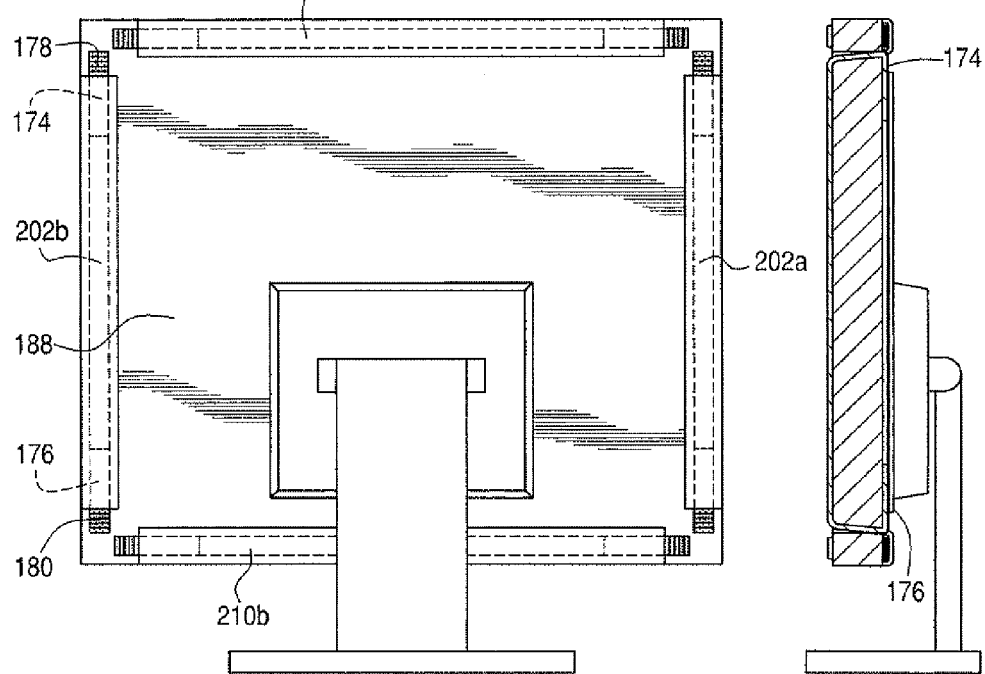

DEVICE FOR DISPLAYING OBJECTS SUCH AS PHOTOS AND SHEETS ON LAPTOP AND VIDEO MONITOR SURFACES

CROSS-REFERENCE TO RELATED APPLICATION

This application is a continuation-in-part of U.S. patent application Ser. No. 12/342,653, filed Dec. 23, 2008, which is pending, the contents of which are incorporated herein by reference.

BACKGROUND OF THE INVENTION

1. Field of the Invention

This invention relates to a device and method to attach objects, such as photos and paper sheets, to a frame or other surface of a video monitor, laptop or other display screen, or framed article, such as a mirror. The device removably holds such objects against a surface without damage to the surface or the objects.

2. Description of the Prior Art

Note and memo boards are known for home and office use. Most of these boards are permanently affixed to a wall surface or comprise a discrete surface of office furniture or an office cubicle. A user may tack or tape notes or photographs or paper sheets to the board for display. Either attachment method mars or damages the photographs or paper sheets. Moreover, such boards generally are not proximate a video display or screen of a computer.

Some note boards have been adapted to fit on or around computer monitors or video displays. U.S. published patent application No. 2004/0227048 A1, for example, shows a monitor frame adhesively attached with hook and loop fasteners to an outer surface of a computer monitor. The frame includes recessed pockets for receiving photographs. As another example, U.S. Pat. No. 6,478,282 discloses a device for holding photographs against the front outer surface of a video monitor. The device has side and bottom edges that are securely attached with hook and loop fasteners to a surface of the monitor. See also U.S. Pat. Nos. 6,412,744; 5,620,162; 6,286,800; and 5,533,702. Each of these devices requires separate fasteners or hinge means to hold a display device to the monitor. Such fasteners or hinges can be difficult to remove and may leave permanent markings that mar the video monitor surface.

U.S. Pat. No. 5,678,792 proposes a flexible, lengthwise deformable band that may be extended around the perimeter of an appliance, such as a microwave oven. A central slot or channel is cut lengthwise into the band. Photographs or other sheets are inserted into the channel. The band may be a continuous stretchable band or may be a length of material having ends adjustably attachable to one another, such as with hook and loop fasteners. The objects, photographs or sheets are held in place in the channel because the band material creates frictional contact with the objects and with the perimeter of the appliance. Without the channel, the objects, photographs or sheets would not be held to be visible to a user from the front of the appliance. See also U.S. Pat. No. 5,890,603.

Other bands that extend around the perimeter of an appliance or display screen are shown, for example, in U.S. Pat. Nos. D469,100 S and 5,664,673. The storage device shown in U.S. Pat. No. 5,664,673 is a belt that is stretched around the top, sides and bottom of a computer monitor. The outfacing surface of such belt may comprise the loop portion material of a hook and loop fastener. Pockets are releasably mounted to the belt material to hold objects. To facilitate positioning an object viewable from the front of the monitor, a front plate that has a pocket must be installed.

Heretofore, all of the band-type mounting and display systems have wrapped around the perimeter of a monitor or appliance, and require separate attachment mechanisms to hold photographs, objects or paper sheets for display from the front of the monitor.

More and more computer users now opt for flat screen computer monitors, which do not have suitable perimeter structure to receive the prior art bands. Alternatively, computer users have laptop computers that have screens integral in the top cover of the laptop casing. Such laptops cannot accommodate the prior art band devices.

The industry continues to seek a display device that is easy to install and easy to remove, and that does not mar or damage objects to be displayed or the computer display screen with which it is used.

SUMMARY OF THE INVENTION

In a first embodiment of the invention, a device for removably mounting objects to a front face of a display screen or frame has a flexible, lengthwise deformable band or band assembly, said band or band assembly has at least two spaced-apart, corner-engaging loops to engage corners of the display screen to removably mount said band to said display screen. Preferably, the band or band assembly has at least three, and more preferably, at least four spaced-apart, corner-engaging loops. The band may be formed from a continuous strand of resilient material, with the corner-engaging loops formed by turning or twisting the strand. Such crossed portions of the strand then may be joined together. Alternatively, the band may have separate corner engaging loops attached at spaced apart locations onto the band.

In one especially preferred embodiment, a band assembly has at least three, and preferably four, loop portions that encircle the top, sides and preferably also the bottom of a display screen or frame. The loop portions are joined together at points of contact or overlap, or the band assembly as configured is integrally formed. At the junctions or overlaps, corner-engaging loops are formed. The band assembly may be installed over at least the top and side display screen or frame surfaces, and the band material of such band assembly frictionally contacts portions of both the front and rear surfaces of such display screen or frame.

The band or each band of the band assembly may have the same or different cross-sectional shape. Examples of possible cross-sectional shapes are circular, square, rectangular, triangular, pentagonal, hexagonal and irregular. One or more bands of the band assembly further may have a wider width than the width of the other bands.

The band or band assembly preferably is formed from a resilient material that may be stretched for installation and for introducing an object for display, but sufficiently recovers from stretch so as to hold the object in frictional engagement to a surface, such as a front or rear surface of a display screen or frame. Suitable resilient materials include rubber, latex, plastosil, thermoplastic elastomer, polyvinyl chloride softened with plasticizer, urethane or polyurethane softened with plasticizer, and any of these materials covered with fibers or textile.

Another embodiment of the invention is a method for removably attaching at least one object to a front or rear surface of a screen display or frame. In this method, a flexible, lengthwise deformable band is installed onto a screen display or frame by extending a first corner-engaging loop formed in or attached to said band over a first corner of said screen display or frame and by extending a second corner-engaging loop formed in or attached to said band over a second corner of said screen display or frame. Optionally, third and fourth corner-engaging loops are extended over other corners of the screen display or frame. The band is deformed to create a space between a portion of said band and a portion of said front or rear face of said screen display or frame. An object is inserted into said space, and the band is released so as to frictionally engage the object and hold the object against the portion of the face of the screen display or frame. The steps may be repeated to insert a second object for display. The object(s) may be removed by deforming the band to re-create a space between the portion of said band and the portion of said face of said screen display or frame contacting said object(s). Objects that may be held by the device according to the invention include, but are not limited to, sheets, photographs, note cards, papers and writing implements.

In an alternative method for removably attaching at least one object to a front or rear surface of a screen display or frame, a first flexible, lengthwise deformable band is installed onto a screen display or frame by extending said first band around a front top portion of said screen display or frame. A second flexible, lengthwise deformable band is installed onto a screen display or frame by extending said second band around a front side portion of said screen display or frame. A third flexible, lengthwise deformable band is installed onto a screen display or frame by extending said third band around another front side portion of said screen display or frame. At least one of said first, second or third bands is deformed to create a space between a portion of said band and a portion of said screen display or frame, and an object is inserted into that space. The at least one first, second or third band is then released to frictionally engage said object against the surface portion of said screen display or frame. Multiple objects may be installed for display by repeating the step of deforming a band or band portion to create a space to hold an object and releasing such band to frictionally engage the object. Yet another embodiment of the invention is a device for removably mounting objects to a front face of a display screen or frame that comprises a band assembly having a first series of four lengthwise deformable sections that meet at respective ends to form corners, and having a second series of four lengthwise deformable sections that meet at respective ends to form corners. The band assembly further has a plurality of joining portions to join the first series of lengthwise deformable sections to the second series of lengthwise deformable sections. A corner-engaging gap is formed between at least one pair of joining portions to receive a corner of the front face of the display screen or frame. Preferably, the band assembly has four pairs of joining portions disposed generally near the corners of the band assembly. The corners of the first series and second series may be curved outwardly, preferably with a radius of curvature in the range of 1 mm to 40 mm. In one preferred embodiment, the joining portions have a length, a width and a thickness, and the length and width are greater than the thickness. In another preferred embodiment, each lengthwise deformable section has a cross-section selected from the group consisting of circular, square, rectangular, triangular, pentagonal, hexagonal and irregular. The deformable sections and joining portions of the band assembly preferably are formed from a material selected from the group consisting of rubber, latex, plastosil, thermoplastic elastomer, polyvinyl chloride softened with plasticizer, urethane or polyurethane softened with plasticizer, and any of these materials covered with fibers or textile.

An alternative for removably attaching at least one object to a front or rear surface of a screen display or frame comprises installing a band assembly onto a screen display or frame by extending a corner-engaging gap over a first corner of said screen display or frame and by extending a second corner-engaging gap over a second corner of said screen display or frame so that the first and second corners are received within the corner-engaging gaps. The corner-engaging gaps are formed between joining portions that join together lengthwise deformable sections forming the band assembly. At least one lengthwise deformable section of said band assembly may then be stretched or deformed to create a space between a portion of said lengthwise deformable section and a portion of said front or rear face of said screen display or frame. A first object may be inserted in that space. When the lengthwise deformable section of the band assembly is released, the object is frictionally engaged and held by the band assembly against the portion of the face of said screen display or frame.

A still further alternate embodiment of a device for removably mounting objects to a front face of a display screen or frame comprises a first lengthwise deformable band defining a top surface and a bottom surface and having a distal end and a proximal end and defining a first length between said distal end and proximal end. A first plurality of ridges extends outwardly from the top surface at or near the proximal end. A second plurality of ridges extends outwardly from the top surface at or near the distal end. A first slot or hole is formed in the front face of the display screen or frame to receive the proximal end of the first lengthwise deformable band, and a second slot or hole is formed in the front face of the display screen or frame at another location spaced apart from the first slot or hole to receive the distal end of the lengthwise deformable band. Multiple such devices may be installed in association with a display screen or frame. Each lengthwise deformable band has a cross-section selected from the group consisting of circular, square, rectangular, triangular, pentagonal, hexagonal and irregular. Preferably the lengthwise deformable band is formed from a material selected from the group consisting of rubber, latex, plastosil, thermoplastic elastomer, polyvinyl chloride softened with plasticizer, urethane or polyurethane softened with plasticizer, and any of these materials covered with fibers or textile.

Still another alternative embodiment is a device for removably mounting objects for display in association with a display screen or frame. The device has a resilient deformable material interposed in a slot or channel formed between a rear surface of an outer frame (said frame generally surrounding a viewing screen) and a screen housing. The slot or channel preferably extends around the entire periphery of the outer frame, and the resilient deformable material preferably is interposed along the entire length of said slot or channel. In one embodiment, the resilient deformable material has a first surface and a rear surface and has a series of upstanding projections extending outwardly from its first surface. The upstanding projections may be directed toward or away from the outer frame. In one of these preferred embodiments, the upstanding projections are prongs with generally circular cross-section. The resilient deformable material may be a material selected from the group consisting of rubber, latex, plastosil, thermoplastic elastomer, polyvinyl chloride softened with plasticizer, urethane or polyurethane softened with plasticizer. In another of the preferred embodiments, the resilient deformable material in the slot or channel is formed as one flap with a slit defined therein or two flaps between which is defined a slit opening. In yet another of these preferred embodiments, the slot is a channel that houses a series of ball bearings.

BRIEF DESCRIPTION OF THE DRAWINGS

FIG. 8 is a right front perspective view of a fourth embodiment of the invention, showing a band assembly according to the invention fitted over a computer display screen;

FIG. 9 is a right front perspective view of the band assembly of FIG. 8;

FIG. 10 is a left elevational view of the band assembly of FIGS. 8 and 9;

FIG. 11 is a right front perspective view of a fifth embodiment of the invention, showing a series of deformable bands held within slots and slotted channels formed integrally within a frame of a computer display screen or monitor;

FIG. 12 is a rear elevational view of the fifth embodiment of FIG. 11;

FIG. 13 is a cross-sectional view taken along line 13-13 in FIG. 11;

FIG. 14 is an enlarged detail of the cross-sectional view of FIG. 13;

DESCRIPTION OF THE PREFERRED EMBODIMENTS

Figure 1:
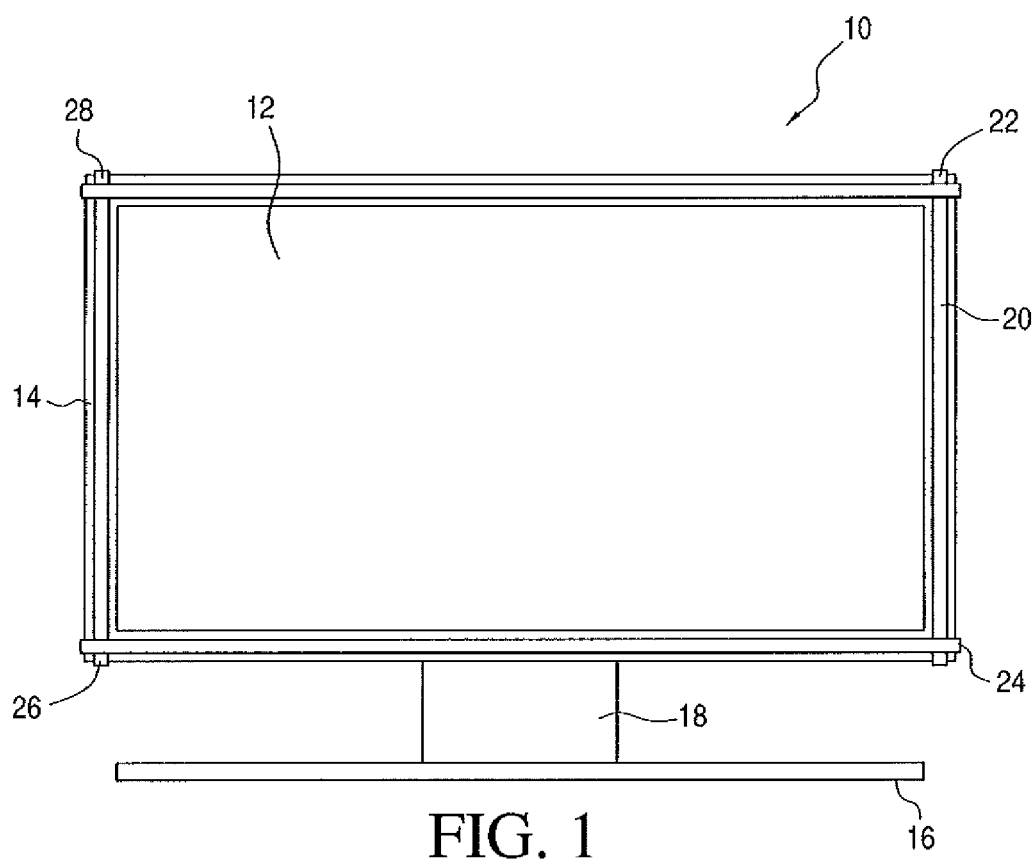
FIG. 1 is a front elevational view of a flat screen display unit onto which is mounted a first embodiment of a device for displaying objects, such as photographs and paper sheets, according to the invention.
Figure 2:
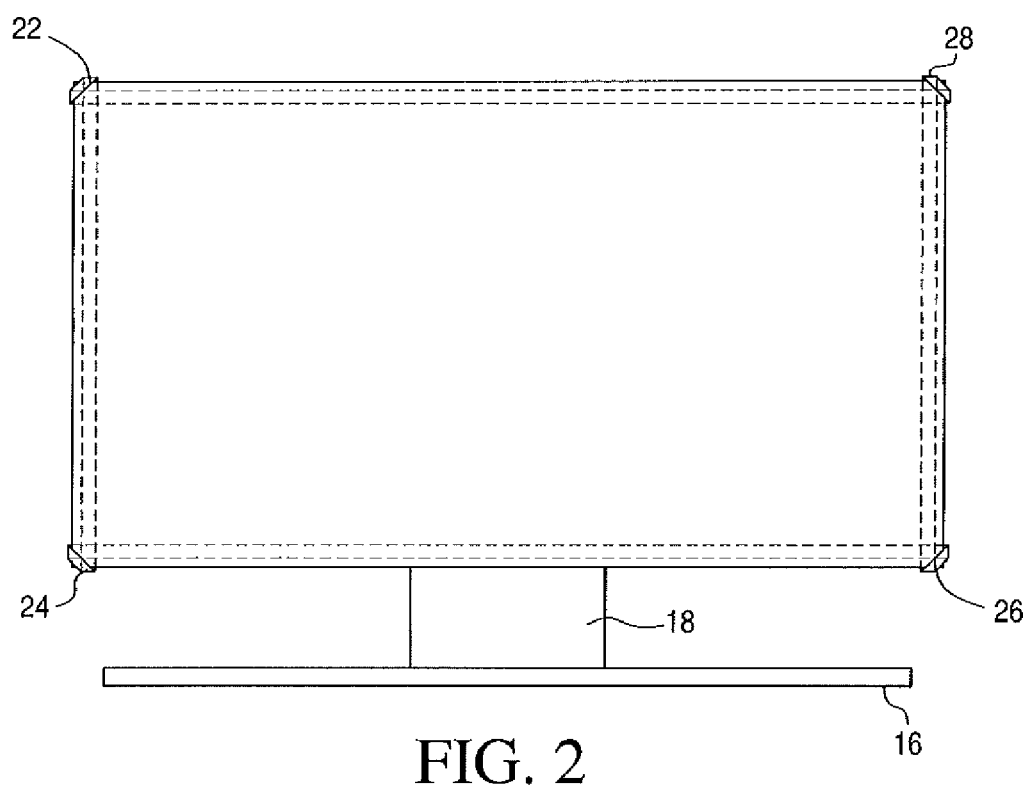
FIG. 2 is a rear elevational view of the flat screen display unit and the first embodiment of the device according to the invention.

Referring first to FIGS. 1 and 2, a first embodiment 10 of the device according to the invention is shown. A screen display 12 surrounded by a screen display frame 14 is supported by a pedestal 18 on a stand 16. The screen display 12 as illustrated is of a type often referred to as a flat screen or flat screen monitor.

Figure 5:
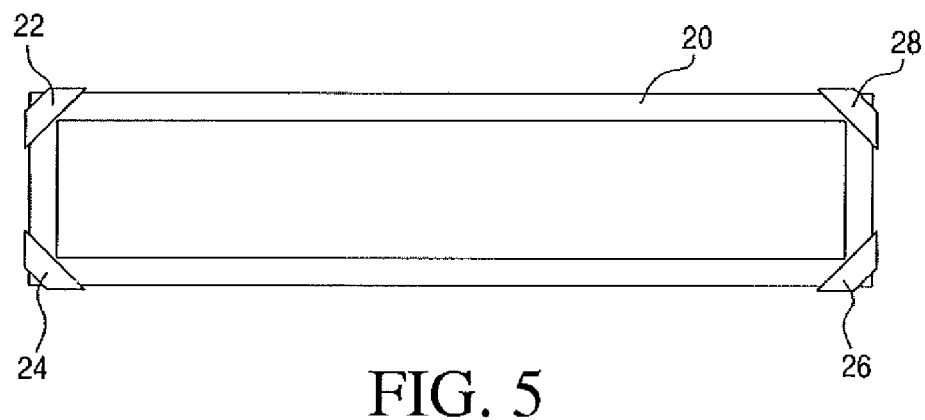
FIG. 5 is a front elevational view of the device of FIG. 1 prior to mounting such device to a computer display screen unit.

A flexible, lengthwise deformable band 20 according to a first embodiment of the invention is mounted over the screen display frame 14 such that portions of the band 20 are in contact with the front face or front surfaces of the screen display frame 14. The band 20 has loops 22, 24, 26 and 28 formed in spaced-apart locations of the band 20. The band 20 is shown separated from a screen display or screen display frame in FIG. 5.

As shown in FIGS. 1 and 2, the loops 22, 24, 26 and 28 of band 20 are mounted for engagement over the corners of the screen display frame 14. Each loop 22, 24, 26 and 28 engages an individual corner to hold the band 20 in frictional engagement to the front face or front surface of the screen display frame 14. If loops 22, 24, 26 and 28 are formed larger, it is also possible, although not optimum and not shown in FIGS. 1 and 2, for portions of band 20 to frictionally contact or engage a front face or surface of the screen display 12.

The band 20 may have two or more loops 22, 24, 26 and 28 formed by twisting and pre-joining portions of contact in a continuous flexible band. Alternatively, band 20 may be a continuous loop of material, and loops 22, 24, 26 and 28 may be formed by twisting band 20 upon installing band 20 for frictional engagement to the screen display or screen display frame 14. As yet another alternative (not illustrated in the Figures), separate smaller loops of preferably stretchy or resilient material may be attached to the band 20 at spaced-apart locations along the length of band 20.

Band 20 is a flexible, lengthwise deformable band. Such band may be formed from a stretchy or resilient material, such as rubber, latex, plastosil, thermoplastic elastomer, polyvinyl chloride softened with plasticizer, urethane or polyurethane softeners with plasticizer. Alternatively, any of these materials may form the stretchy or resilient core of a stretch composite yarn or strand, such as a stretch composite covered by textile or natural or synthetic fibers. A material that has surface tackiness to removably "stick" to surfaces of the screen display or screen display frame and to surfaces of objects is one preferred embodiment.

Band 20 has a length, thickness and width. The width of one portion of the band 20 may be greater than the width of other portions. In cross-section band 20 may have a generally circular, square, rectangular, triangular, pentagonal, hexagonal or irregular shape. A preferred band cross-section is a shape that has at least one generally flat surface for contact with a face or front surface of a screen display or screen display frame.

Figure 3:
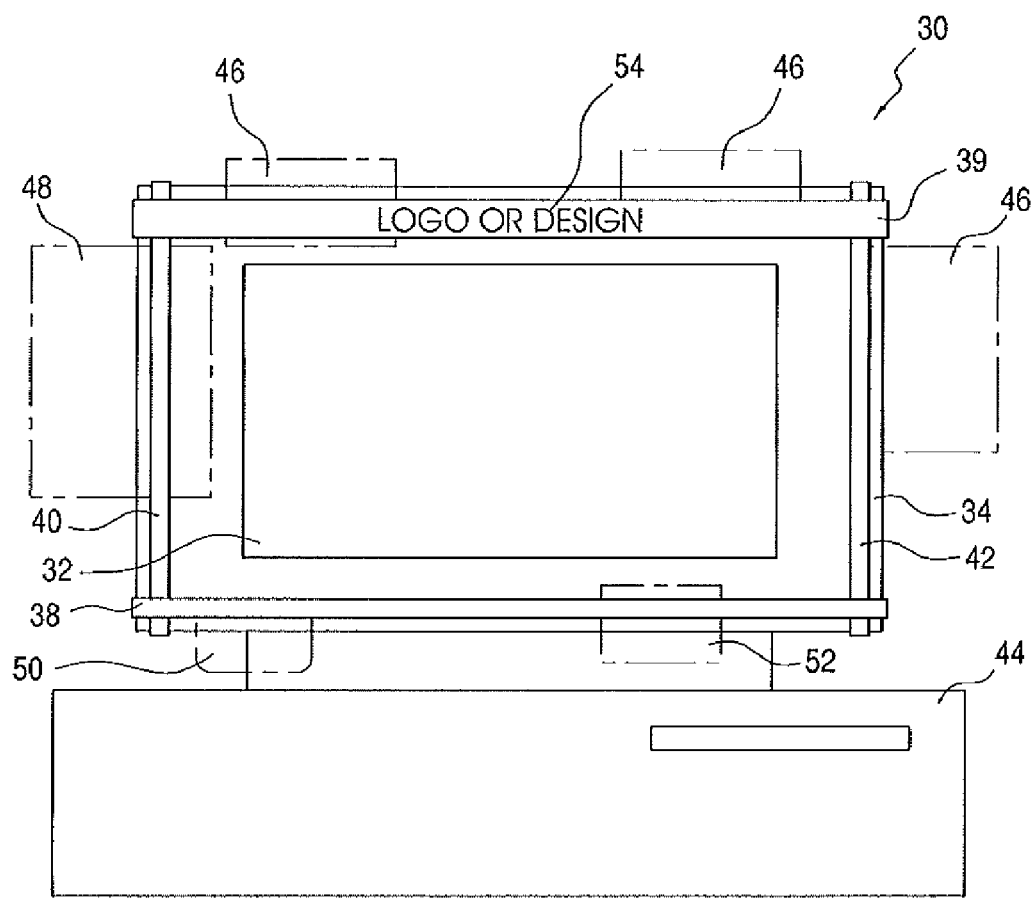
FIG. 3 is a front elevational view of a flat screen display unit and computer hard drive, wherein a second embodiment of a device for displaying objects according to the invention is mounted to said flat screen display unit.

Referring next to FIG. 3, a second or alternate embodiment 30 of the invention comprises a series of bands 36, 38, 40 and 42 for mounting to a screen display 32 or screen display frame 34. The screen display 32 stands over a computer hard drive 44.

As shown in FIG. 3, first band 42 is mounted around screen display frame 34 at one vertical side. Second band 40 is mounted around screen display frame 34 at a second vertical side. Third band 38 is mounted around screen display frame 34 and over portions of bands 40 and 42. Fourth band 36 is mounted around screen display frame 34 and contacts portions of bands 40 and 42. Fourth band 36 has a width greater than the widths of bands 38, 40 and 42. A logo or design 54 may be preprinted on or pre-affixed to one of the bands. In FIG. 3, a logo or design 54 is displayed on a front surface of band 36.

Various objects may be held by frictional engagement between one or more of bands 36, 38, 40 and 42 and a face or front surface of screen display 32 or screen display frame 34. Shown in phantom outline in FIG. 3 are photographs 46, a paper sheet 48, a business card 50 and a note or post-it note 52. Various other objects that may be removably held by bands 36, 38, 40, or 42 to a front surface of a screen display 32 or screen display frame 34 include writing implements, fasteners, note cards, etc. Ideally, bands 36, 38, 40 or 42 have a tacky surface that removably "sticks" to the objects and to a face surface of the screen display 32 or screen display frame 34, where the amount of tackiness is not so great as to mar, stain or damage the objects or the screen display or screen display frame.

The series of bands 36, 38, 40 and 42 optionally may be pre-joined together at predetermined or anticipated overlap points so as to facilitate installing such bands over a screen display frame 34. Optionally, the series of bands may be formed as a unitary band assembly (refer to FIGS. 6 and 7 and the accompanying text).

Bands 36, 38, 40 and 42 may be formed of the same or different materials. Optional material selection for such bands is set out with respect to band 20 for the embodiment of the invention illustrated in FIGS. 1, 2 and 5.

Figure 4:
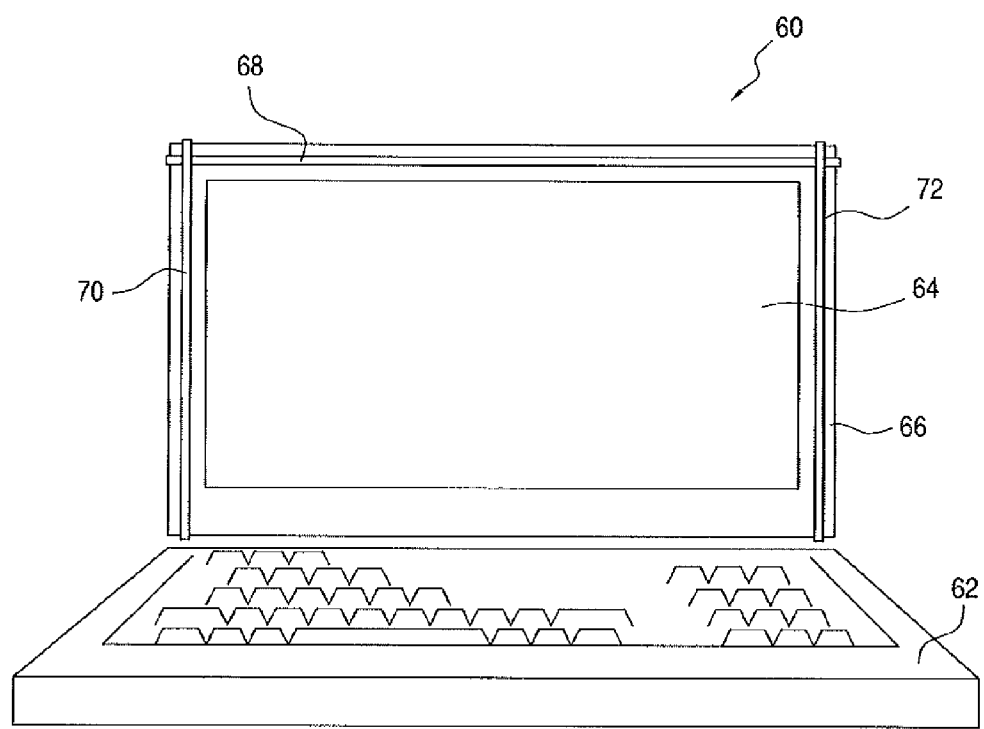
FIG. 4 is a front elevational view of a laptop computer onto which a third embodiment of a device for displaying objects according to the invention is mounted.

Referring next to FIG. 4, another embodiment 60 of the invention is shown for use with a laptop computer. In FIG. 4, a laptop keyboard 62 and screen display 64 are shown Screen display 64 has a surrounding screen display frame 66. Such screen display 64 and screen display frame 64 are within the cover portion of the laptop computer. A hinge portion (not shown) joins the cover portion to the laptop keyboard 62.

Bands 68, 70 and 72 wrap around portions of the screen display frame 66. As shown in FIG. 4, band 68 wraps about a top frame portion, whereas bands 70 and 72 each wrap about different side portions. As installed, bands 68, 70 and 72 permit objects to be held for display between a front face surface of screen display 64 or screen display frame 66 and said bands. As installed, in the embodiment shown, bands 68, 70 and 72 do not interfere with opening or closing of the laptop cover.

Figure 6:
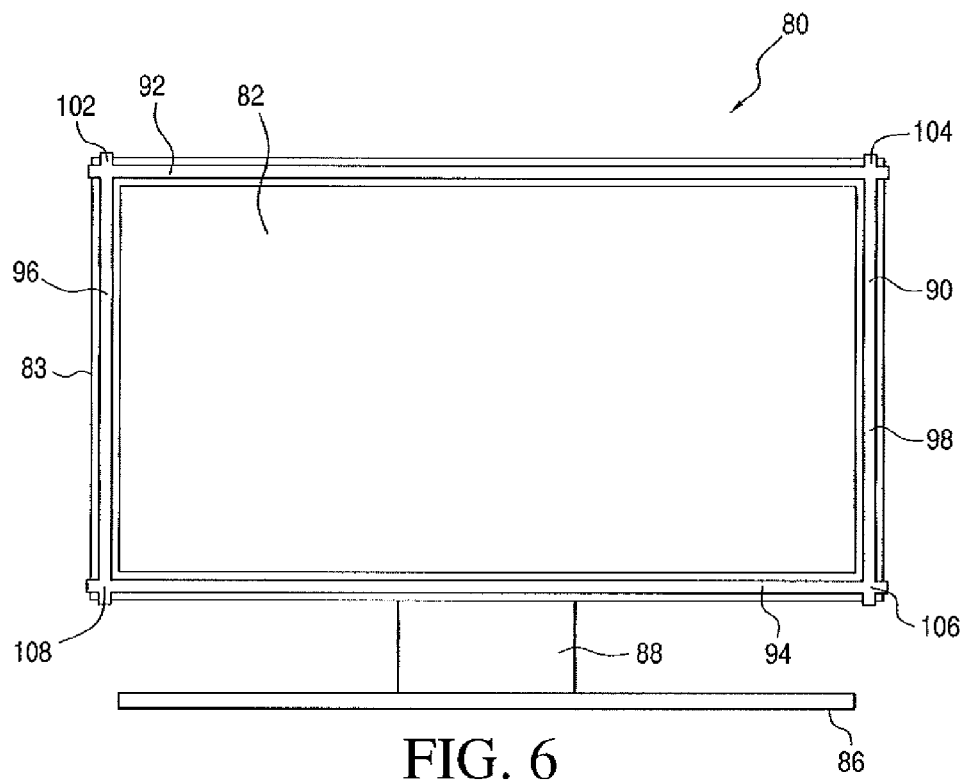
FIG. 6 is a front elevational view of a flat screen display unit onto which is mounted a fourth embodiment of a device for displaying objects, such as photographs and paper sheets, according to the invention.
Figure 7:
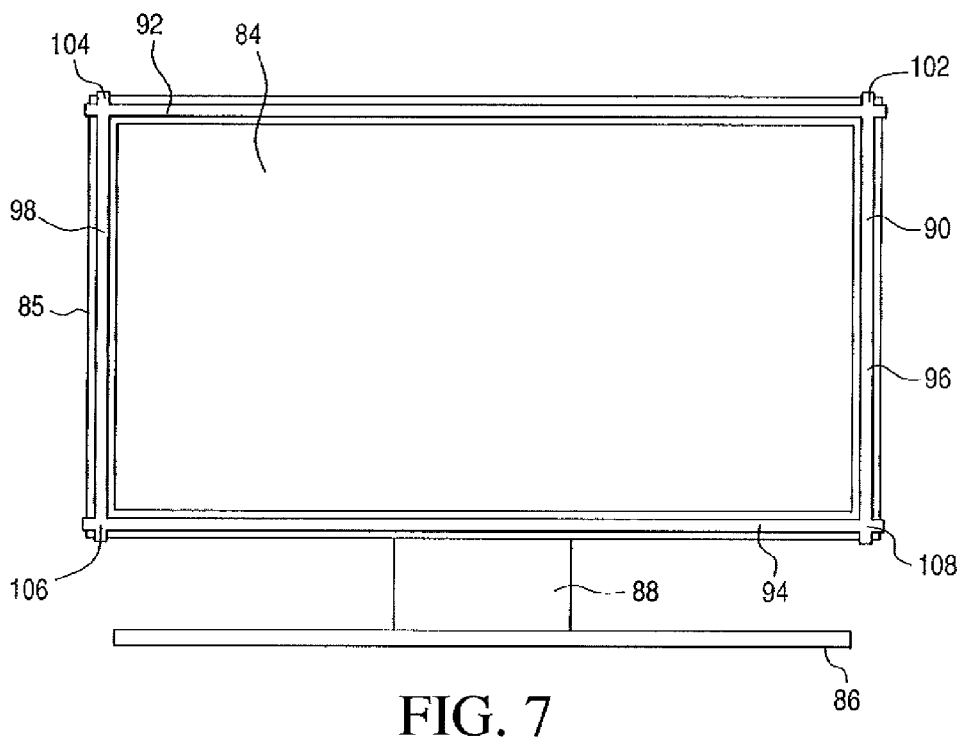
FIG. 7 is a rear elevational view of the flat screen display unit and the fourth embodiment of the device according to the invention.

Referring next to FIGS. 6 and 7, a fourth embodiment 80 of the invention is illustrated. A screen display 82 surrounded by a screen display frame 83 is supported by a pedestal 88 on a stand 86. The front of the screen display is shown in FIG. 6, and the rear 84 of the screen display is shown in FIG. 7. In this embodiment, a deformable band assembly 90 engages the front surface of screen display frame 83 and rear surface 85 of screen display frame. The deformable band assembly 90 has top 92, bottom 94, left side 96 and right side 98 frame engaging major loop portions, each of which contacts the front surface and rear surface of the screen display frame when mounted. Corner engaging loops 102, 104, 106, and 108 are formed in the band material generally at the locations of overlap in the major loop portions. In this fourth embodiment 80, objects may be held by frictional engagement between one or more of the major loop portions 90, 92, 94 and 96 and either the front face or front surface of screen display 82 or screen display frame 83 or the rear face or rear surface of the screen display 84 or screen display frame 85. This fourth embodiment 80 having band material in contact with both the front and rear surfaces of the screen display or screen display frame has increased retractive gripping force as compared to the first embodiment shown in FIGS. 1 and 2.

The deformable band assembly 90 may be formed of the same or different materials, and if of one material may be integrally formed or molded. Preferably, the deformable band assembly 90 is an integral structure as shown in FIGS. 6 and 7, but optionally may be formed from a series of four separate band portions joined together at points of overlap. Optional material selection for such band assembly 90 is set out with respect to band 20 for the embodiment of the invention illustrated in FIGS. 1, 2 and 5.

A fourth embodiment of a band assembly 120 according to the invention is shown in FIGS. 8 to 10. The band assembly 120 includes a first series of lengthwise deformable sections 122, 124, 126, and 128 that are joined together at their ends to form corners 138a, 140a, 142a and 144a, and a second series of lengthwise deformable sections 130, 132, 134, and 136 that are joined together at their ends to form corners 138b, 140b, 142b and 144b. The two series of lengthwise deformable sections are then joined together by reinforcements or joining portions 154a, 154b, 158a, 158b, 162a, 162b, 166a, and 166b. The two series of lengthwise deformable sections are maintained in spaced apart relation from one another, and the reinforcements or joining portions also are spaced apart so as to form corner-engaging gaps 156, 160, 164 and 168.

The lengthwise deformable sections may be integrally formed or may be separate sections subsequently joined together. Similarly, the reinforcements or joining portions may be integrally formed or may be separate structures subsequently joined to the lengthwise deformable sections. Preferably, all structure forming the band assembly 120 is formed from the same material, which may be any number of materials, including but not limited to rubber, latex, plastosil, thermoplastic elastomer, polyvinyl chloride softened with plasticizer, urethane or polyurethane softened with plasticizer, and any of these materials covered with fibers or textile. Preferably, the band assembly 120 is molded. The lengthwise deformable sections are sufficiently resilient that they may be stretched or deformed and will recover or substantially recover from such stretch or deformation.

The reinforcements or joining portions 154a, 154b, 158a, 158b, 162a, 162b, 166a, and 166b are shown in FIGS. 8 to 10 as having a generally square top surface with straight sidewalls and a thickness comparable to the thickness of the lengthwise deformable sections 122, 124, 126, 128, 130, 132, 134, and 136. The reinforcements or joining portions may have alternative shapes and thicknesses as desired.

FIG. 8 shows the band assembly 120 installed over a frame 150 of a display screen 152. The corner-engaging gaps 156, 160, 164 and 168 seat over and engage the corners of the frame 150. The corners of the band assembly 138a, 138b, 140a, 140b, 142a, 142b, 144a and 144b as shown in FIGS. 8 and 9 are curved outwardly with a radius of curvature r preferably in the range of 1 to 40 mm. By forming the corners to have such a curve, the corner-engaging gaps 156, 160, 164 and 168 of the band assembly 120 may more easily be deflected and thus engaged over the corners of a computer display screen or monitor.

Once fitted over a computer display screen or monitor, the band assembly 150 may hold objects or articles for display by frictional engagement between one or more lengthwise deformable sections 122, 124, 126, 128, 130, 132, 134, and 136 and the front or rear surface of the computer display screen or frame 150 by deforming a lengthwise deformable section and installing an object or article between the lengthwise deformable section and the front or rear surface of the computer display screen or frame. The displayed object or article may be removed therefrom by again deforming the lengthwise deformable section and removing the object or article.

In a fifth embodiment of the invention, an assembly 170 for removably frictionally engaging articles or objects to a computer display screen or frame is installed integrally into the computer display screen or frame. As shown in FIGS. 11 to 14, a series of lengthwise deformable bands 172 each having a distal end 174 and a proximal end 176 are removably positioned within supporting structure within the computer display screen or frame. FIGS. 11 and 12 shown a series of four deformable bands 172, with a separate band extended along the top, a separate band extended along the bottom, and two additional separate bands extended along the side front face surfaces of the frame 190. It is of course possible to provide fewer than four deformable bands, or to provide more than four deformable bands in the computer display or frame as desired.

The deformable bands 172 each have a series of ridges 178 projecting from a surface at or near their distal ends 174, and a series of ridges 180 projecting from a surface at or near their proximal ends. Each end of a band 172 held against a front side surface 192 of the frame is inserted into a respective slot (e.g., 196a, 198a, 196b, 198b), and each end of a band 172 held a against a front top or bottom surface of the frame 190 is inserted into a respective slot (e.g., 204a, 206a, 204b, 206b). The distal and proximal ends 174, 176 of the left and right side deformable bands 172 are then inserted or threaded into a respective channel or slot 200a or 200b formed between the rear face of the frame 188 and an upstanding wall structure 202a or 202b. The distal and proximal ends 174, 176 of the top and bottom side deformable bands 172 are then inserted or threaded into a respective channel or slot 208a or 208b between the rear face of the frame 188 and an upstanding wall structure 210a or 210b.

The series of ridges 178 project from a face surface of the deformable bands 172 and provide increased frictional engagement between the deformable bands within the slots 196a, 198a, 196b, 198b, 204a, 206a, 204b, 206b and the channels 200a, 200b, 210a, and 210b. The ridges 178 grip a ledge of a respective slot, to help maintain the deformable band 172 therein. Referring particularly to FIG. 14, the ridges 178 are provided near the distal end of the deformable band 172. The ridges 178 are formed with teeth-like, jagged tips, but other ridges with more rounded top surfaces. The term "ridges" has been used herein to denote any raised structure of the deformable bands to enhance frictional engagement between the deformable bands and the slots and channels formed in the frame.

The deformable bands 172 may be formed from any number of resilient deformable materials, including, but not limited to rubber, latex, plastosil, thermoplastic elastomer, polyvinyl chloride softened with plasticizer, urethane or polyurethane softened with plasticizer, and any of these materials covered with fibers or textile.

Figure 15:
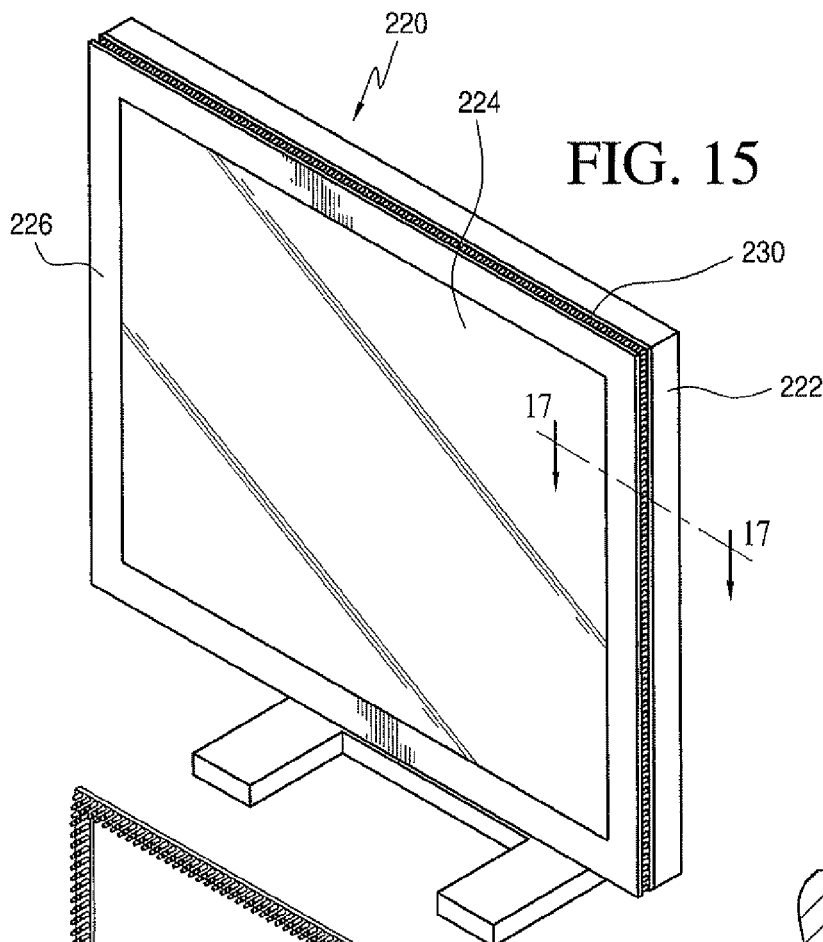
FIG. 15 is a right front perspective view of a sixth embodiment of the invention, showing a resilient deformable material within a slot or channel about the periphery of a frame of a computer display screen or monitor.
Figure 16:
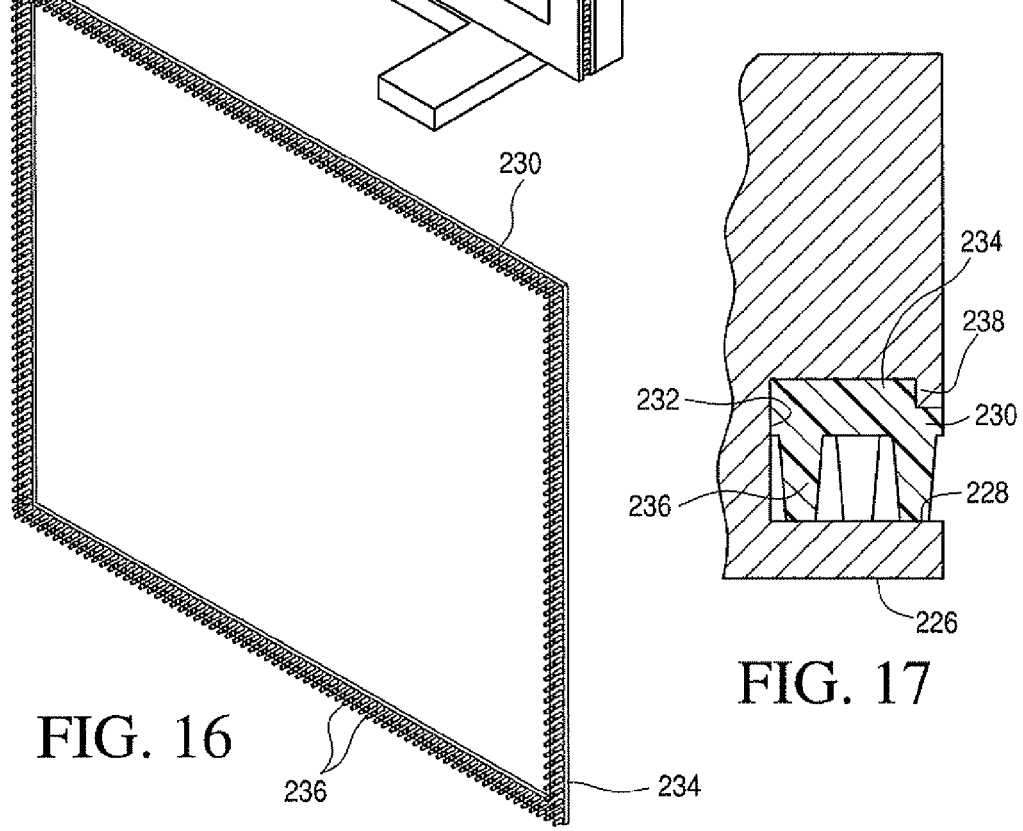
FIG. 16 is a right front perspective view of the resilient deformable material of FIG. 15.
Figure 17:
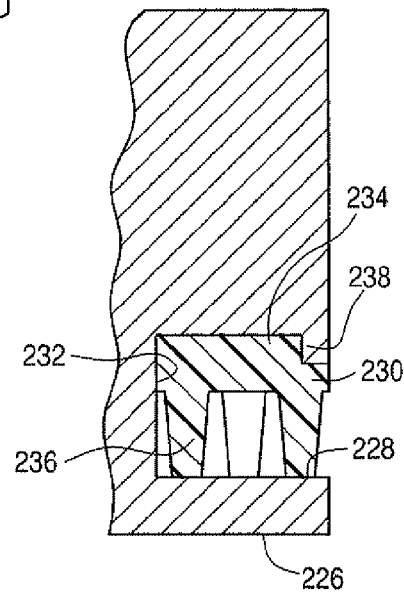
FIG. 17 is a cross-sectional view taken along line 17-17 in FIG. 15.

FIGS. 15 to 17 illustrate a sixth embodiment of the invention in which an assembly 220 for removably frictionally engaging articles or objects to a computer display screen or frame is installed integrally into the computer display screen or frame. A resilient deformable material 230 is installed into a slot or channel 232 formed around all of the periphery of the frame 222 or within a portion of the periphery of the frame 222. FIG. 15 illustrates a resilient deformable material installed into a slot or channel 232 formed around all of the periphery of the frame 222. The frame 222 has a front surface 226 and a rear surface 228. Between the front surface and rear surfaces 226, 228 the frame 222 defines the slot or channel 232. As shown in FIG. 17, the slot or channel 232 may have a narrower opening leading to a wider opening so that the resilient deformable material 230 may be seated therein and held by depending lip 238.

In the sixth embodiment, the resilient deformable material 230 comprises a band of material having a base portion 234 defining a surface from which a series of projections 236 extends. The base portion 234 is shaped so as to fit within the slot or channel 232. The projections 236 illustrated in FIGS. 16 and 17 comprise tapered tubular teeth with generally round cross section that have a wider diameter where the projections join the base portion 234. Other projection cross-sectional shapes may be used. In FIG. 16, the projections 236 are formed in a single row projecting from a generally central position of the band of material forming the resilient deformable material 230. Additional rows of projections may be provided.

The resilient deformable material 230 may be made of any number of resilient deformable materials, such as but not limited to rubber, latex, plastosil, thermoplastic elastomer, polyvinyl chloride softened with plasticizer, urethane or polyurethane softened with plasticizer. Such resilient deformable material 230 flexes when compressed and rebounds from compression when the compressing force is removed. The resilient deformable material 230 deforms and thereby engages an object or article inserted into the slot or channel 232. When the object or article is removed from the slot or channel 232, the resilient deformable material 230 recovers or substantially recovers from its deformed position.

Alternatively, the resilient deformable material 230 may be a series of ball bearings, roller bearings or other deflectable material held within the slot or channel 232. The bearings may be formed of various materials, including but not limited to metal, plastic or rubber.

In yet another alternative embodiment, the resilient deformable material 230 held in the slot or channel 232 may be one or multiple flaps that define one or more slits into which an object or article may be partially inserted and frictionally engaged.

The bands and band assemblies and resilient deformable materials of the invention have been illustrated herein in connection with displaying objects in contact with a display screen frame or display screen surface of a laptop or computer monitor. It is to be understood that the bands and band assemblies of the invention also may be used to facilitate displaying objects in association with other household and workplace structures, such as, for example, frames, mirrors, and hand-held portable devices like music players.

The invention has been illustrated by detailed description and examples of particular embodiments. Various changes in form and detail may be made to the illustrative embodiments without departing from the spirit and scope of the present invention. Therefore, the invention should be measured by the claims and not limited by the description of the examples or the particular embodiments.

What is claimed is:

1. A device for removably mounting objects to a front face or a rear face or both front and rear faces of a display screen or frame, comprising:

a band assembly having a first series of four lengthwise deformable sections that meet at respective ends to form corners, and having a second series of four lengthwise deformable sections that meet at respective ends to form corners, wherein each of said sections have a length and a width and a thickness, and a plurality of joining portions to join the first series of lengthwise deformable sections to the second series of lengthwise deformable sections, wherein a first corner-engaging gap is formed between at least one pair of joining portions to receive a corner of the display screen or frame, and through said gap at least a portion of the corner is exposed, and a second corner-engaging gap is formed between at least one other pair of joining portions to receive a second corner of the display screen or frame, and through said second gap at least a portion of the second corner is exposed, and wherein said joining portions each have a display screen- or frame-contacting surface and an outer surface opposite the display screen- or frame-contacting surface and a length and a width and a thickness, with said joining portion length being longer than the width of the section at a respective corner and with said joining portion width being longer than the width of the section at the respective corner and with the thickness of said joining portion greater than the thickness of the sections at the respective corner.

2. The device of claim 1, wherein said band assembly has four pairs of joining portions disposed generally near the corners of the band assembly.

3. The device of claim 1, wherein the corners of the first series are curved outwardly.

4. The device of claim 1, wherein the corners of the second series are curved outwardly.

5. The device of claim 3, wherein the radius of curvature is in the range of 1 to 40 mm.

6. The device of claim 4, wherein the radius of curvature is in the range of 1 to 40 mm.

7. The device of claim 1, wherein the joining portions have a length, a width and a thickness, and the length and width are greater than the thickness.

8. The device of claim 1, where each lengthwise deformable section has a cross-section selected from the group consisting of circular, square, rectangular, triangular, pentagonal, hexagonal and irregular.

9. The device of claim 1, where the deformable sections and joining portions of the band assembly are formed from a material selected from the group consisting of rubber, latex, plastosil, thermoplastic elastomer, polyvinyl chloride softened with plasticizer, urethane or polyurethane softened with plasticizer, and any of these materials covered with fibers or textile.

10. A method for removably attaching at least one object to a front or rear surface of a screen display or frame, comprising:

installing a band assembly onto a screen display or frame by extending a first corner-engaging gap over a first corner of said screen display or frame and by extending a second corner-engaging gap over a second corner of said screen display or frame so that the first and second corners are received within the corner-engaging gaps with at least a portion of each of the first and second corners exposed through the respective corner-engaging gaps, wherein said corner-engaging gaps are formed between joining portions that join together lengthwise deformable sections forming the band assembly, wherein said joining portions each have a display screen- or frame-contacting surface and an outer surface opposite the display screen- or frame-contacting surface and a length and a width and a thickness, with said joining portion length being longer than the width of a lengthwise deformable section at a respective corner and with said joining portion width being longer than the width of the section at the respective corner and with the thickness of said joining portion greater than the thickness of the section at the respective corner;

deforming at least one of the lengthwise deformable sections of said band assembly to create a space between a portion of said lengthwise deformable section and a portion of said front or rear face of said screen display or frame;

inserting a first object in said space; and releasing said lengthwise deformable section to frictionally engage said object so as to hold the first object against the portion of the face of said screen display or frame.

11. The method of claim 10, wherein the object is selected from the group consisting of sheet, photograph, note card, paper and writing implement.

12. The method of claim 10, further comprising:

deforming at least one other lengthwise deformable section to create a second space between said other lengthwise deformable section and a second portion of said screen display or frame;

inserting a second object in said second space; and releasing said band to frictionally engage said object so as to hold the second object against the second portion of said screen display or frame.

13. The method of claim 10, wherein the band assembly comprises a first series of four lengthwise deformable sections that meet at respective ends to form corners, and a second series of four lengthwise deformable sections that meet at respective ends to form corners, and a plurality of joining portions to join the first series of lengthwise deformable sections to the second series of lengthwise deformable sections, so as to form the corner-engaging gaps between pairs of joining portions.

* * * * *